United States Patent
Busch et al.

(10) Patent No.: US 6,656,050 B2
(45) Date of Patent: Dec. 2, 2003

(54) ODDS ACCELERATOR FOR PROMOTIONAL TYPE SWEEPSTAKES, GAMES, AND CONTESTS

(76) Inventors: Steven Busch, 1304 SW. 160th Ave., #135, Sunrise, FL (US) 33326; Scott Bolton, 1304 SW. 160th Ave. #135, Sunrise, FL (US) 33326

( * ) Notice: Subject to any disclaimer, the term of this patent is extended or adjusted under 35 U.S.C. 154(b) by 0 days.

(21) Appl. No.: 09/920,940

(22) Filed: Aug. 3, 2001

(65) Prior Publication Data

US 2002/0028708 A1 Mar. 7, 2002

Related U.S. Application Data

(60) Provisional application No. 60/222,946, filed on Aug. 4, 2000.

(51) Int. Cl.[7] .................................................. A63F 13/00
(52) U.S. Cl. ........................ 463/42; 273/236; 700/91; 705/18
(58) Field of Search ............................. 463/22, 26, 30, 463/31, 40–42; 273/138.1, 236, 264, 271; 700/90–91; 705/14–18, 26, 500

(56) References Cited

U.S. PATENT DOCUMENTS

| | | | | |
|---|---|---|---|---|
| 6,061,660 A | * | 5/2000 | Eggleston et al. | 705/14 |
| 6,077,162 A | * | 6/2000 | Weiss | 273/143 R |
| 6,173,267 B1 | * | 1/2001 | Cairns | 705/14 |
| 6,182,967 B1 | * | 2/2001 | Green | 273/260 |
| 6,251,017 B1 | * | 6/2001 | Leason et al. | 273/138.2 |
| 6,267,672 B1 | * | 7/2001 | Vance | 463/29 |
| 6,328,339 B2 | * | 12/2001 | Dixon et al. | 283/52 |
| 6,390,921 B1 | * | 5/2002 | Busch et al. | 463/17 |
| 6,398,643 B1 | * | 6/2002 | Knowles et al. | 273/157 A |

* cited by examiner

Primary Examiner—Gene Mancene
Assistant Examiner—Patrick Buechner
(74) Attorney, Agent, or Firm—Liniak, Berenato & White (57) ABSTRACT

A method and apparatus for effectuating sponsor and player driven winning of multiple types of sweepstakes type promotions, contests and games through the unique use of automated game entry, enhanced sharing and trading of game pieces and of an Odds Accelerator that creates variable odds. The present invention provides the unique ability to add real-time variable odds changes to any given sweepstakes or promotion type game involving elements of chance or skill based on pre-determined sponsor rules. The system creates the ability for the players of a given promotion to join together via the system and increase all players' odds of winning a given prize or prizes. The system receives and stores data on its members including the number of elements played, the number of winning elements distributed, the number of losing elements distributed, and any other information required pursuant to set sponsor rules so as to determine the variable nature of a particular game's odds.

26 Claims, 4 Drawing Sheets

Fig. 1

| How to Play | FREE Stuff | Cola | Privacy Policy | Help | My PIPGO |

Welcome to Cola Cap-Code Madness!

1. Enter your Cap Code Number
   Please type in your Cap-Code
   number here and click enter Code: K254SLP —16
   User Name: cosmo@anything.com —12
   Password: —14

☐ Check here to save your sign in
   information. This will automatically sign      ENTER
   you in next time you visit us!

2. Not a Member? Sign in here to Become a Member:
   Please fill out the form below completely. All fields must be
   out in order to play. Click enter only once when finished.
   Password must be 8 characters long.

Email Address:
   Create a Password:
   Retype Password:

ENTER

| How to Play | FREE Stuff | Cola | Privacy Policy | Help | My PIPGO |

Cosmo, Welcome to Cola Cap-Code Madness!

Inbox

From: PIPGO Support Team
Subject: New Game Piece
Date: 04/21/2001

Message

You have a new game piece [P11], [P11], [G35] Click to Send to Inbox

Please feel free to contact me for anything I can do to help.

Best regards, and have a great day!

Scott Bolton
Director of PIPGO.com Program
players@pipgo.com

Fig. 4

| How to Play | FREE Stuff | Cola | Privacy Policy | Help | My PIPGO |

Welcome to Cola Cap-Code Madness!

Inbox

From:     PIPGO Support Team
          Subject:                 New Game Piece
          Date:                    04/21/2001

Message

Congratulations! You have sucessfully traded G38 [G38] to Joey in exchange for [P7] . Click to Send to Inbox Please feel free to contact me for anything I can do to help.

Best regards, and have a great day!

Scott Bolton
Director of PIPGO.com Program
players@pipgo.com

ODDS ACCELERATOR FOR PROMOTIONAL TYPE SWEEPSTAKES, GAMES, AND CONTESTS

This application claims the benefit of U.S. Provisional Application No. 60/222,946 filed Aug. 4, 2000.

BACKGROUND OF THE INVENTION

1. Field of the Invention

This invention relates to promotional gaming methods. More specifically, the invention creates the ability for sponsors, their customers or others related to a contest, to use "member cards", credit or debit cards, and Point-of-Sale cash registers and their like, as well as wireless device usage (cell phones, palm pilots, hand held digital assistants, etc.), physical phone line usage, Internet Service Provider usage, and electronic order taking services and other loyalty-type programs typically associated with an account number, to automatically enter players into a sweepstakes type contest such as a "collect and win" and "match & win" game. The invention also defines a system to allow any player to easily share or trade game pieces for the purposes of gaining a higher probability of winning contest. The invention creates the ability for sponsors to increase all players' odds of winning a "collect & win" or other type sweepstakes, game or contest through use of an Odds Accelerator. The Odds Accelerator creates or adds an extra winning piece, rare piece, element, or chance to a sweepstakes type game, promotion or contest when certain parameters are met. Furthermore, the invention also creates the ability to incorporate "automated" game play for member card holders who do not have or cannot afford access to or who do not desire to access the game's host web site thus creating a "virtual Internet" collect & win or match and win promotion.

2. Background of the Invention

On-line and Off-line Retailers and manufacturers such as consumer packaged goods (CPGs) companies and grocery chains, among others, commonly sponsor promotional games. These games are intended to drive traffic to certain locations, increase sales or usage of specific products, and/or simply to reward customers for loyalty. Such games (games will be used synonymously with sweepstakes, contests and promotions throughout) come in many forms as will be readily known and understood by those skilled in the related art, including, random drawing sweepstakes, instant win packaging, lotteries, collect & win and match & win contests.

In two types of promotional games, (a so called "collect & win" game or a so called "match and win" game) a player must collect a combination of elements in order to win a prize or one of many prizes given by the sponsor. For example, a cola beverage manufacturer may print letters inside the bottle cap, and a player needs to collect the series of bottle caps with the letters C-O-L-A to win a prize or the company may print images on a cap and a player must match the image to an identical image on another cap. The game is usually available nationally if not worldwide and the odds of winning certain prizes are related to product distribution and availability among many other factors. Therefore it is difficult to collect the series of winning game pieces, since for example all of the bottle caps are dispersed over an extremely large area of the planet and, currently, there are typically only one or two "extremely rare" winning caps. If the winning cap is on the West Coast, and you live on the East Coast, your odds of winning are extremely low. The reason for only one or two rare pieces is that, prior to this invention and a prior invention file by the authors, no reasonable system existed to allow total control over game piece distribution and price awards. For example, if the "A" in the cola game above was the rare piece needed to win one million dollars and 1000 "A's" were printed and redeemed, then the potential prizes claimed against the sponsor would be devastating. Nevertheless, the possibility, albeit remote, of winning a prize of significant value provides a powerful incentive to prospective patrons.

Although off-line games of this nature, and other similar schemes utilizing an element of random chance, may be useful marketing tools, they suffer from several drawbacks. For example, manufacture and distribution of the game pieces is expensive and time consuming, especially when millions or billions pieces are made per game. Additionally, security measures must be implemented in order to prevent persons involved in distributing the pieces from stealing or diverting rare or winning pieces for personal use. Likewise, extremely time-consuming measures must be taken to inspect each piece in order to ensure that the correct number of winning pieces is made and excessive pieces are placed in circulation. Yet another current drawback of these games, especially "collect & win" or "match & win", is that patrons playing the game must store each piece until a match has been made, if ever. This is a burden on the consumer and makes the games less attractive overall. Additionally, off-line, and some on-line, games of this nature are not normally integrated with any mechanism for compiling a list of patrons entering an establishment or purchasing or using a product for use in future promotional efforts. In yet another drawback, many of these games require redemption by mail. All of the aforementioned drawbacks are eliminated or greatly reduced as a result of this invention and U.S. patent application Ser. No. 09/498,748 filed on Feb. 7, 2000, now U.S. Pat. No. 6,390,921, which is hereby incorporated by reference (hereinafter "'921 patent").

In fact, the '921 patent is a system that allows disparate people or groups of people to acquire valuable prizes, especially for "collect & win" and "math & win" games, via the sharing of specific or unique pieces over the system. The technology wherein the odds of winning increased were not practical until the invention set forth in the '921 Patent was reduced to practice. Although the preferred embodiments disclosed in '921 Patent provide highly useful games, further improvements are still desirable. In particular, it would be desirable to provide improved games within the broad meaning of the '921 patent which provide patrons/ consumers with even greater motivation to participate in promotional games so that revenue, brand awareness, and off-line/on-line traffic will increase while opening the potential for large cost savings by eliminating pre-made physical pieces and for the development of on-line communities relating to a given sponsor or group of sponsors.

Thus, this invention complements and adds several completely new layers to collect & win, match & win and other games as disclosed in the '921 Parent, First, the invention herein automates the distribution of game pieces through appropriate programming and downloading/uploading of consumer data on a "member card" or "member card" database. The automated entry may be on a real-time or delayed basis depending on the technology available to a sponsor or to our site at any given time. For example, some Point-of-Sale (hereinafter "POS") systems may require a "batch" to be uploaded to our system for processing once per at least one day; or some POS systems may utilize appropriate technology to upload triggering plays at our site on a real-time basis; likewise, receipt codes or product codes or on-product codes ("cap-codes") may generate game plays on a real-time basis at time of entry on our site, or on a delayed basis so as to work with the automated portion of a game. A "member card" is any loyalty system or use of a product by a person, business or organization as previously describe above in the Background of the Invention. For example, a grocery retailer may distribute "member cards" to its patrons for such privileges as check cashing, purchase discounts, and the collection of demographic information among other reasons. A "member card" is also used herein to describe usage based services such as cell phones and other wireless devices, land-line local and long-distance phone services, on-line user fees, on-line "grocery cart checkouts" and other such services not to be limited by the above. Specifically, the system described herein utilizes and/or integrates with our system, a game sponsor's member card data collection or POS system to automatically generate and enter online (Internet/World Wide Web) game pieces for said sponsor's members. In one embodiment of the invention, receipt codes or other game codes would be used in conjunction with said cards for use by players without such cards. In yet another embodiment of the invention, it will be assumed that any such game will comply with all Federal, State, County, City, and Country laws regarding sweepstakes type contests. Therefore it is assumed that the aforementioned will include an option to obtain codes for a given game by means of the postal or email services. The following are examples for illustration purposes only and should not be deemed complete in any way: a per minute use X of a cell phone results in a game play; an on-line stock trade with confirmation results in a game play; a long-distance phone call over 10 minutes results in a game play; the use of a credit card X to purchase product Z results in a game play; a use of X minutes over prepaid Hand Held Device Q results in a game play; the use of a grocery check cashing card X to purchase products A, B or C results in 1, 2, or 3 game plays; the additional minutes purchased with a calling card results in a game play, etc.

Secondly, the invention herein creates a "virtual Internet" for our customers utilizing "member card" systems. A "virtual Internet" is created by our system for use by players/members that have no web access or no desire to access the web in order to play our games. For example, a poor inner city youth has purchased a bottle of Cola, among other items, at his local grocery store and "swiped" his loyalty card in order to obtain an on-line game piece(s) in the "Cola—Cola Challenge". In order to play the game piece, the youth must go to our web site, enter his member card #, select his game piece from his "in-box" and play the piece per the game's rules. This becomes a problem, however, if the youth does not have ready access to the Internet. The present invention solves this problem for the youth and the retailer by allowing game pieces to be automatically played for each member cardholder's account. For example, after the youth swiped his card, the purchase of a Cola was recorded on the store's POS system and associated with the member card. The data is then uploaded to the system created by this invention which then generates a game piece at our site for said member card. The system then "plays" the game piece for the member and, if the member wins, the system "credits" the member's card with the prize if it is cash or a free Cola. In this manner the next time the youth uses the member card, his total cost will be deducted by the amount of the prize. Alternatively, if the prize is a tee shirt, car or similar physical item, the system utilizes the member card data to ship the prize to the cardholder. This system greatly increases the benefits of being a card member. Some companies employ a "usage" method to award points or to award entry into a random drawing sweepstakes. The present invention herein does not seek to apply itself in any manner as the aforementioned methods; rather the invention is a game system related to "collect and win" or "match and win" contests.

Thirdly, the invention herein uses a system centered on an "Odds Accelerator" in conjunction with a game type promotion if a game's sponsor or rules allow. The Odds Accelerator increases participants' odds of obtaining the "rarest" piece in a promotion type game based upon a triggering event. For example, a player obtains the "C" in C-O-L-A and there is only one "C" in the game. Thus if this player can obtain the "O, L, A" within the time permitted, either on their own or through the Odds Accelerator system, said player or said player and said player's "pals" wins the game to the detriment of all other players. After implementing the present invention, the system may be configured to create another rare piece (the letter C) once the rarest piece has been "created", "distributed" or played. The piece played need not be physically created but may be offered by the sponsor online or through other means in a virtual context. This betters the odds for all players, unless the original winning letter has already been matched and the prize claimed, although a sponsor may want more winners to create excitement and thus another "rare" letter/code can be added upon the triggering event. This is also a major improvement over the traditional collect and win or match and win games because now, a rare piece may be generated by the triggering event even if the triggering piece is never played. In other words, in a classic game, a rare piece that has been acquired is lost forever if it is thrown away, discarded, lost or otherwise ignored by the person who holds it. Our new system allows more rare pieces to be printed in a controlled manner once the triggering event has occurred, thus making the game more exciting to the consumer and more valuable as a tool for the sponsor because no is worried about the rare piece being discarded. Furthermore, in the event that a game is nearing its time based deadline, i.e., most games exist for a specified period of time, and no rare piece has been activated, our system creates the ability to add more rare pieces to the pot in a controlled manner. This is possible only because our system, as previously described '748 Application allows for the tracking of all pieces on a real-time basis. Off-line games of a similar nature have no ability to do this, nor have any online games been developed with the purposes of the present invention in mind. It will be appreciated that there are unlimited ways to implement such an Odds Accelerator. The system may, based on the rules of the game, continue to generate more "rare" pieces as time goes on and in an ever-increasing manner, or as set by a sponsor, until a winner or winners are established per pre-determined protocols. Thus, the system described herein allows for greater chances of winning for all participants while allowing for a greed and time is running out factor to the first player of the rarest piece. Such a case occurs when only one or two rare pieces will be allowed to win, but the first player of the rare piece may lose if he does not get the other letters before the Odds Accelerator generates another rare piece which is played and filly matched first by a subsequent rare piece holder.

Fourth, in yet another embodiment of the present invention, a system is developed to ensure the ease of limited or unlimited trading and/or sharing of game pieces a player and at least one other player or more. Specifically, each game may make use of an "In-Box", "Share-Box", "I have box" and an "I want box." Previous ways of sharing information on the web between participants includes systems such as message boards, chat rooms, on-line auctions and instant messaging. However, none of these systems allows players to easily share and/or trade game pieces for collect and win and match and win games. The system herein defined makes the sharing and trading of pieces simple while establishing a "clearing house" or "middleman" to act as a "safe harbor" for game participants. Once a player's piece has been generated by the system, it may be sent to that player's "In-Box". The player may then play the piece on a message board or move it to one of the other boxes listed above. For example, the player, Bob, has game piece B12 but does not need it to win a prize. Bob may choose to share the piece openly with his teammates or the general population of game participants by moving it to his "Share-Box". The system then matches the piece with that of another player, Susan, who has entered B12 in her "I Want Box." Bob will get no game piece in return. Furthermore, Bob may move another piece, G38, to his "I Have" box in hopes of obtaining G40, which he has entered in his "I Want" box. Should one of his teammates or another game participant, Jill, enter the opposite way, e.g., G38 to the "I Want" box and G40 to "I Have", then the system matches the pieces with the corresponding players and "trades" or exchanges the pieces. In this scenario G38 would go to Jill's "In-Box" and G40 would go to Bob's "In-Box". Likewise, both original pieces are removed from the appropriate "I Have" and "I Want" boxes of Bob and Jill, i.e., they made a trade and keep only one side of the transaction. It is anticipated that any piece in any player's "In-Box", "Share-Box", "I have box" or "I want box" will be available to play or move around between boxes until a successful transaction has occurred to remove said piece from a player's possession. However, moving a piece from one box to another changes its status appropriately. For example, moving R45 from the "I Have" box to the "In-Box", removes its eligibility for sharing or trading until such time, if ever, that it is moved back. Therefore, exchanges may only be made from the "I Have", "I Want", "Share" or other box. All of said sharing will be matched by the system on a Date and Time basis. For example, once Bob has entered G38 into his "Share" box, then the first player or teammate to enter G38 into their "I Want" box will get the game piece. It will be appreciated that the system may be configured in such a way as to allow unlimited rules regarding the sharing or trading of game pieces, how the timing of such exchanges will occur will depend on a Sponsor's rules. It is anticipated that a sponsor will limit the number of players a participant my share with to a specific number so as not to break the game's odds too quickly. Thus the system will use the appropriate software and hardware to facilitate forming, linking and trading between teammates.

Fifth, another embodiment of the present invention is to utilize an on-line "prize distribution" link. Such a link allows a player of one of our games to hyperlink to the game Sponsor's web-site and claim a "your choice" prize based on "levels". For example, during a Coca-Cola collect and win game, players must spell "carbonation", "cola", etc. Alternatively, players may also obtain "instant win" game pieces in lieu of or in combination with "letters" that allow them to claim a prize with or without spelling anything. In this new system, the game site would link the instant winner or a spell complete winner, that is a player who was able to obtain enough letters to spell the target word such as "cola", to the Sponsor's on-line store site. In the above Cola example, the winner would be sent to the Cola's on-line nostalgia store and may choose a "prize" based on a "level" scheme such as, but not limited to: "level 1" wins your choice of a hat, tee-shirt or socks; "level 2" wins your choice of vintage cola posters or vintage bottles of the beverage; and "level 3" wins your choice of a Cola bicycle or Jukebox, etc. As a result, our new system enables Sponsor's to offer consumers, i.e., game players, an unlimited prize choice system for winning a collect and win type game on an as claimed basis while driving traffic to the Sponsor's site and potentially increasing sales there as well. This is a particularly important and new because now, as a consumer, you won't be forced to win 10 hats or 20 free drinks. The system creates the ability for many more choices and increase accountability to the sponsor.

The present invention thus solves several problems with paper based collect and win games, while creating more exciting and uniquely different games then are currently available and for an end product(s) (in the form of prizes) to be acquired while lowering printing and distribution costs, as will be described herein.

SUMMARY OF THE INVENTION

The apparent advantages and objects of the invention of the computer based method and apparatus according to the invention follow herein.

It is an object of this invention to further utilize the general "game piece sharing" system contemplated by the '921 patent in conjunction with, but not limited to, the following objects. The "game piece sharing" system herein contemplated may be configured in multiple ways as defined and customized for individual sponsor's and is not to be limited by any limitations of the '921 patent.

It is a further object of the invention to facilitate the automated on-line entry of an eligible player into a collect and win or other sweepstakes type promotion, game or contest by means of a "member card". It should be noted that a potential player under this new system does NOT have to have Internet access in order to get a game piece or prize on-line and thus a virtual web is also created. In this embodiment of the invention, consumer purchase information is retrieved by the system from a sponsor's data collection system, usually a software integrated Point-of-Sale (POS) system, or a credit card/loyalty type system where some type of "triggering data" is entered onto a system, usually by phone or computer, to be used for billing, awarding, tracking, etc., matched to predetermined protocols on our system, and any triggering purchases/events then cause a random "collect and win" or other type game piece to be awarded to the purchaser or group of purchasers. Such piece may be automatically "played" at the game site so that the patron does not have to safely store and cross check all of his/her pieces. There is less chance of someone throwing away the most rare piece as a result, thus making the game more exciting and winnable.

It is another object of the invention to facilitate the on-line entry of an eligible player into a collect and win or other sweepstakes type promotion, game or contest by means of a "receipt code" or other type-coded indicia that will be used to generate a "play" directly on the game site. In this particular embodiment of the invention, a consumer would enter their "game code" at the game site where the system verifies the code eligibility and, if eligible, generates a random game piece or pieces for that player or group of players. An example of a similar system is "mail in" piece codes. This allows all patrons, not just patrons with "member cards" to play in the game. One advantage of this system is to entice non-members to become "cardholders" so as to automate their entry process and develop loyalty to the sponsor. This type of entry could be used for, but is in no way limited to, consumer product sales games initiated only at the sponsor's store, such as a supermarket chain X, or worldwide if applicable such as a cola brand X game where you can get automated entries at supermarket chain X or manual entries by buying cola brand X anywhere and entering the underlying cap code at the game site.

It is another object of the invention to facilitate an increase in the number of users of a particular "member card" by providing a reason, in the form of an automated prize entry, for a person to become a "member" of a particular business, organization or group. For example, these may include grocery store chains, credit cards, bankcards, cellular phone service providers, loyalty programs, etc. In another embodiment of the present invention, non-card users who obtain a game code piece by means other than a "member card", will be offered a chance to "sign up" for a "member card" at the game site. It is anticipated that a player who signed up for a member card would then have to follow applicable and appropriate steps to obtain said card. Such steps may include filling out detailed personal information and providing legal identification, among many potential others.

It is a further object of the invention to allow member card users to be credited with appropriate prizes they may have won from playing a particular game, including but not limited to: cash prizes; coupons; discounts on next purchases; money value used for shopping sprees; loyalty points; free products at participating sponsors; free cellular phone time. For example, a patron obtains a game piece resulting in "you have won a free X brand soda". The free X brand soda will be applied at the patron's next checkout assuming they are trying to purchase X brand soda or the patron, via the system, may have the option of "free X brand soda certificate" by e-mail or regular mail. In this particular embodiment of the invention, members may automatically, whether actually notified if they have won or not, get use of in-store prizes at their next or some subsequent checkout. A five dollar value win for example will decrease their next grocery bill by five dollars, limitations may be placed upon redemption such as a time period of 10 days so as to entice repeat store visits. Likewise, the user of a credit card promotion may obtain a piece that awards frequent flyer points instead of a game piece. Our system will then automatically award the points to the appropriate patron's credit card point account. In yet another embodiment, the patron may choose, if permitted within the scope of the sponsor's rules, to trade the points obtained in exchange for a game piece or prize from another game player, or auction the points on the site's auction center. In yet another embodiment, the patron may use the points, based on the rules of the game, to "buy a right" to a free "spin" and the chance to get a bigger prize or a needed game piece/indicia. It should be understood that the above examples may apply to one or more games depending on the game structure and rules. Some aspects may not be used for all games, but in no way are the above examples to be interpreted as limiting in any way. The automation of prize distribution is advantageous because it greatly reduces so called "fulfillnent" costs such as shipping, handling and consumer contact.

It is a further object of the invention to allow longevity to at least one type of game by means of a "special random drawing round", usually, but not necessarily, on an annual or semi-annual basis. In this embodiment of the invention, all winners of a pre-determined prize level and/or predetermined games or game pieces, will automatically be entered into a random drawing sweepstakes with a high-value prize at least once per year. Thus, if a supermarket runs a series of promotions throughout a given year, patrons will be enticed to continually play, even if they don't collect letters, because they may be automatically entered into the year-end random drawing. This is a valued improvement over other random drawing games on the Internet in that there will be a limited number of entries and thus substantially greater odds of being the big winner. In one embodiment of the system, if a player has elected to use our "odds breaker" sharing technology and has formed a group with which to share pieces, then all players that are part of a group gets one random entry, when any one group member gets a random entry. It is contemplated that the game piece acquired per a game's rules may include a prize or game piece such as "you have won an entry into the year end random drawing for $1 million."

It is a further object of the invention to create a feasible way for marketers of these games to eliminate the need for costly time, development and distribution of game pieces. In this embodiment of the invention, game pieces are generated electronically at the game site on the web. Actual physical game pieces are not required and pieces are generated as needed. In yet another embodiment of the invention, pieces may be randomly generated at the POS system for further download later and then each player is assigned their pieces on upload and appropriate crossing checking of system protocols and applications. Although other sweepstakes type promotions currently use on-line game pieces, our system creates a greater marketing advantage by allowing players to share and trade the pieces.

It is another object of the invention to provide a means for allowing players from all designated playable geographic areas to increase their odds of obtaining the most "rare" piece so as to increase their chances of winning a prize or "the big prize" by sharing game pieces with other players or by use of the Odds Accelerator previously discussed and referred to as the odds accelerator. The Odds Accelerator adds more rare pieces to a game based on a triggering event. The advantage is an Odds Accelerator is that the game has significantly more marketability and the participants have significantly better odds of obtaining a rare game piece then under current or classical collect and win or match and win games.

It is another object of the invention to utilize computer modems, telephones, satellites, televisions, radios and other communication devices connected with or on the system or the Internet; through such allow the system to determine a triggering event that accelerates all players' odds of winning a given promotion. The term Internet is used synonymously with the term "World Wide Web" (WWW) throughout.

A specific object of the invention is to develop promotional games where the only place a player will be able to obtain a "game piece" or an "accelerator game piece" is via communication in a form with the system. These pieces are virtual in nature, in that they exist only on the game system according to the invention and may or may not be combined with other virtual or physical pieces from other players to win a prize, dependant on the sponsor's rules. An accelerated piece is a game piece that is typically rare in nature and typically associated with a large prize. For example, there may be only one letter "C" in a COLA spell game, but the triggering event results in at least one more letter "C" being added to the "pot".

It is a further object of the invention to allow the holder of a "rare" element to auction, trade or negotiate the ownership percentage of a given prize based on a perceived or actual value of the rare piece, again in accordance with the games regulations. In other words, if the prize is one million dollars and the accelerator has begun, the rare piece holder can try to end the game fast by sharing the rare piece with others, but may try to get more than one share of the pie since said piece is harder to come by.

An advantage of the invention is to offer greatly bettered odds of winning to all players while helping sponsors to appear as if a game can actually be won and thereby increasing interest in the games and ultimately generating more sales.

A further advantage provided by the invention is that sponsors have a way of combining TV ads or programs, and product sales to generate interest in their products and web sites, due to the present invention. The system allows brick and mortar companies, e.g., grocery chains, cell phone companies, consumer product manufacturers, a reason to have a web presence.

A further advantage of the present invention is to allow people without Internet access, the ability to participate in a given promotional game and be notified of winnings by the system or the system administrators. For example, a 70-year-old "member card" holder uses her card at supermarket chain Z to purchase a "promotional" product K. She does not have Internet access but, because she is "known" by the system from using her card, she will be automatically credited with any prizes or will be sent such prizes physically by the system administrators. Thus, the system enables anyone to have access to prizes and game pieces whether they are web enabled or not. Not withstanding above, the system will be somewhat constrained by any given sponsor's rules and, as such, may only allow activation of prizes or pieces by players actually visiting the site and performing various tasks, such as answering questions, filling out prize forms, verifying data, completing surveys, etc. Furthermore, it is anticipated that the "virtual" playing of a piece on behalf of a member card holder may be based on whether or not a sponsor allows for such in its rules and whether or not the sponsor may require the member card holder to specifically request to be included in such a system as contemplated above. However, the clear advantage is a more marketable member card or loyalty card for the sponsor.

It is an object of the system to perform tracking and referencing of the data received for a player and for other players each having inputted unique data to the system. The data is matched to preset criteria via the system as a player or players play an element(s) in order to trigger an accelerating event. (The Odds Accelerator need not be used in conjunction with member card related games. It can also be used in other on-line and off-line promotions.)

The system notifies the multiple players of a promotion via the system, for example through email, a website or in-store alerts, of the occurrence of a triggering event and the subsequent odds acceleration, i.e., increased chances of obtaining specific elements or prizes. In the case of off-line notification, similar information may be obtained at each participating store by means of a Game Information Board. Please note that an Accelerator piece may a rare piece, an instant prize piece, or any other piece as defined by a sponsor's rules as eligible for Accelerator. The advantage of such a system and its ability to notify players if a crucial piece has been obtained, played or is sitting in a player's "In-Box" creates a significant advantage over other collect and win and match and win promotions by making the game more exciting for the consumer and thus more valuable to the sponsor. The time and date of data received for each unique triggering element(s) is stored and used for referencing, thereby allowing for the smooth and rules based acceleration of rare or winning elements.

A specific object of the invention is to integrate into the game a system for easily sharing, storing and trading virtual (on-line generated) game pieces. The system may use an "In-Box", "Share Box", "Trade Box" ("I Have Box") and an "I Want Box" to easily facilitate sharing and trading. The many advantages of such a system include consumers (players) ability to safely store pieces for future use, to increase their odds of obtaining necessary pieces no matter where they live, for example if they live in Vermont and the piece they need is available in Japan, and to get "play value" from the game among others. Likewise, many advantages are thus created for the sponsor including a more marketable "consumer friendly" game and increased one to one contact with the consumer after the consumer has left the store, among others.

The system can receive and input data for multiple different games, each having unique game parameters and multiple game players. The system references the data by generating virtual game elements with the unique data. The above-mentioned advantages and objects of the present invention will further become apparent when taken with the detailed description of the invention.

DETAILED DESCRIPTION OF THE INVENTION

The invention is a computer system apparatus and a method for using a computer system to facilitate the automated acquisition of a game piece or pieces, the increasing likelihood of obtaining a "rare" or winning game piece by a player or players and to allow for the sharing and/or trading of game pieces between specific or all players, in order to increase a player's ability to beat the odds. The players are participating in a particular "collect & win", "match & win", or other type promotional game, in order to win a predetermined prize or prizes given by the sponsor of the game. The system receives and inputs data from a player or a Sponsor's database, into a computer system provided on a server referred to as the "host", which is affiliated or linked to a game web site located on the Internet. The data may include a game piece involved or the codes necessary to generate a virtual game piece and the system provided by the present invention tracks and references the data for further use. The system's game site is exemplified herein preferably as a web site on the Internet. However, it will be recognized that the game site may be accessed, available, and/or furnished by a number of alternative methods provided by the state of the art, for instance Web-TV, satellite or wireless communication, Cable-TV, etc.

Figure 1:
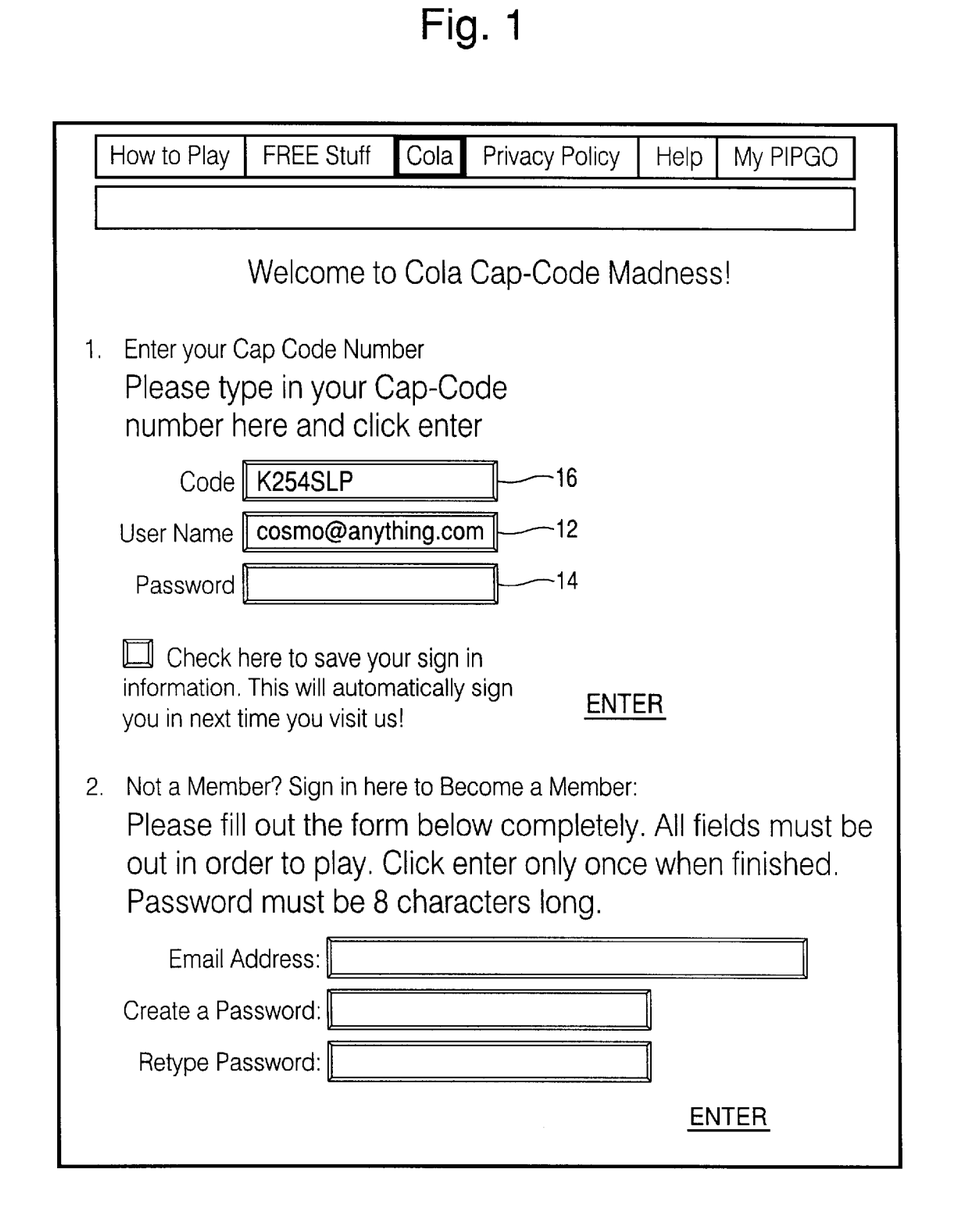
FIG. 1 is a view of a sign in page.

Referring to FIG. 1, in order to input the game piece data into the computer database/system, a player using a Username 12 and Password 14 logs onto the appropriate game's web site home page and then clicks on an icon for the game the player wishes to play. The sponsor or host assigns the username and initial password to a player. The player may then access the host's website and change the password to limit access to the player's data. In an alternate embodiment, the player determines his username and password from the onset. The player then answers or declines to answer any questions supplied by the system or game sponsor, if any. If the data was obtained by the automated method, for example data uploaded to the host's system from the Sponsor's POS or other database system or member card system, then the player simply clicks on his prize board to see if they won anything or alternatively the rules may require the player to "play" his own pieces as the player sees fit by dragging, clicking or some similar method of player interaction with the system as is commonly known to those skilled in the art.

Alternatively, if a player did not possess the appropriate member card at the time of purchase, or if member cards are not being used in the game, then coded data 16 must be input by the player in order to cause the system to generate virtual game pieces. Such codes 16 may consist of, but are not limited to, various numbers printed on a receipt, codes printed on or under bottle caps and candy wrappers etc. These codes 16 are commonly referred to as "Consumer Packaged Goods Codes or "CPG codes", UPC codes, or serial numbers in the art. It is anticipated that a receipt transaction code plus a time and date code associated therewith or "CPG codes" will be the primary means of generating non-member card game pieces.

The system verifies "receipt codes" and "CPG codes" by performing cross-referencing functions between data supplied by the game's sponsor and the system's "Virtual Piece Generator". For example, if a CPG code is used, the system verifies its validity by matching the code with a pre-set database of eligible game codes. If the code is determined as eligible the system then generates a virtual game piece for the player. The code is then marked as used in the database and may not be used again. If a player then attempts to use the same code again, the system activates a pop up message stating that said code has already been used. Similarly, if the code entered by the player is not in the system's database of eligible codes then the system activates a pop up or other type message that states the code is invalid. Likewise, if a receipt code is being used to generate a virtual game piece, it is anticipated that the player must enter a transaction code along with the time and date the code was generated, although any combination of receipt codes may be used depending on the functionality of the Sponsor's receipt generating systems, in order to obtain a game piece—these codes are commonly printed on most receipts. Once again, the system cross references, on a real-time or delayed basis, the inputted codes to the Sponsor's database to verify the requisite transaction occurred, generates a game piece if the codes are valid, and marks the codes as used and no longer eligible for future plays.

The above steps are then repeated based on the number of codes a player has available to enter and obtain game pieces. It will be appreciated to one skilled in the art that each code may generate any number of "results" including but not limited to: one or more game pieces; "sorry, try again"; and "instant wins" such as a free tee-shirt or frequent flyer points. It is also disclosed that a player may enter more than one code at a time in order to speed up the process of obtaining and playing game pieces.

Figure 2:
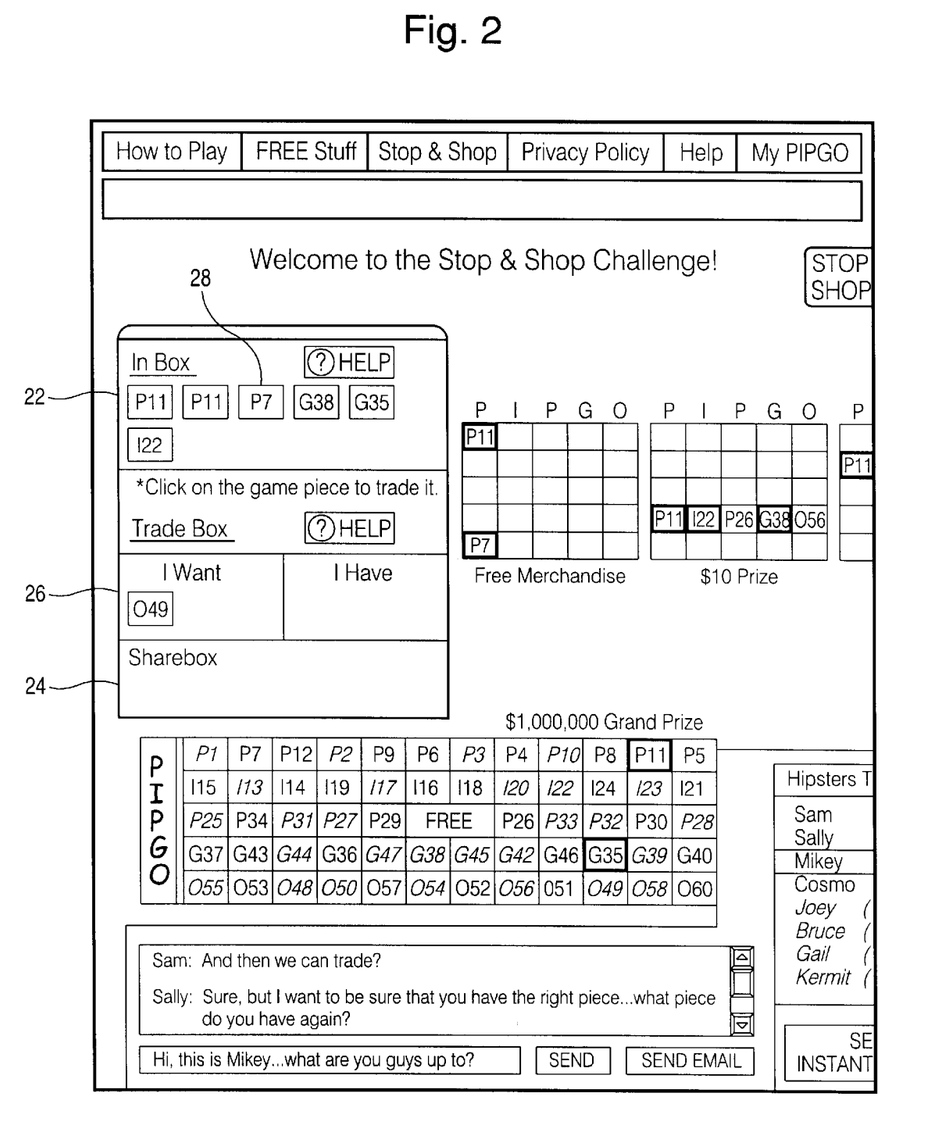
FIG. 2 is a view of the In-Box.

It is anticipated that once game pieces have been generated they will drop into a specific player's or group of players' in-box 22 as seen in FIG. 2. Players may then drag or move the game pieces to their "share-box" 24, trade-box 26, "I have box", "I want box" or other similar "box" or play the pieces on a game board. The game pieces are displayed in an email format 28, however, any other format commonly known in the art may also be utilized.

Figure 3:
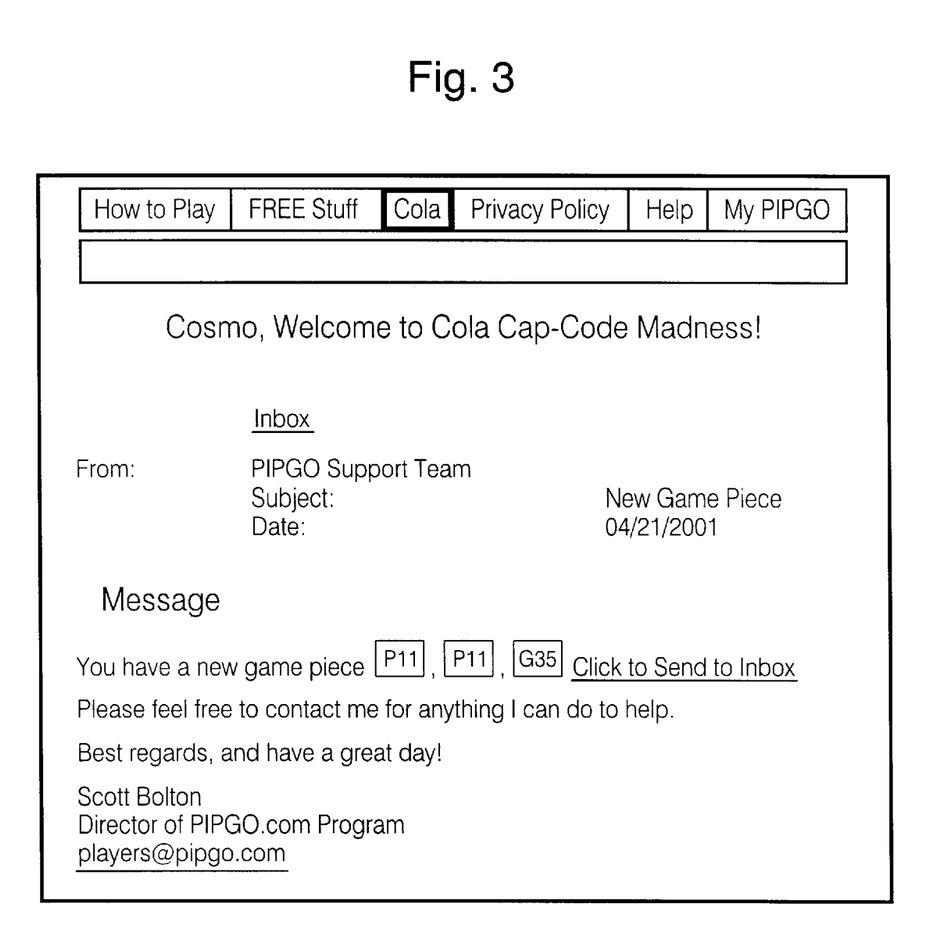
FIG. 3 is a view of a notification of receipt for a new game piece.

As seen in FIG. 3, a player may view a more detailed description or additional information by selecting the game piece from one of the boxes mentioned above. Alternatively, a player may wish to accumulate game pieces by simply leaving them in their in-box to play, share or trade at a later date. Again, these pieces are to be used in collect and win or match and win type promotions and the scope of sharing or trading game pieces is not to be limited to these or following examples.

Figure 4:
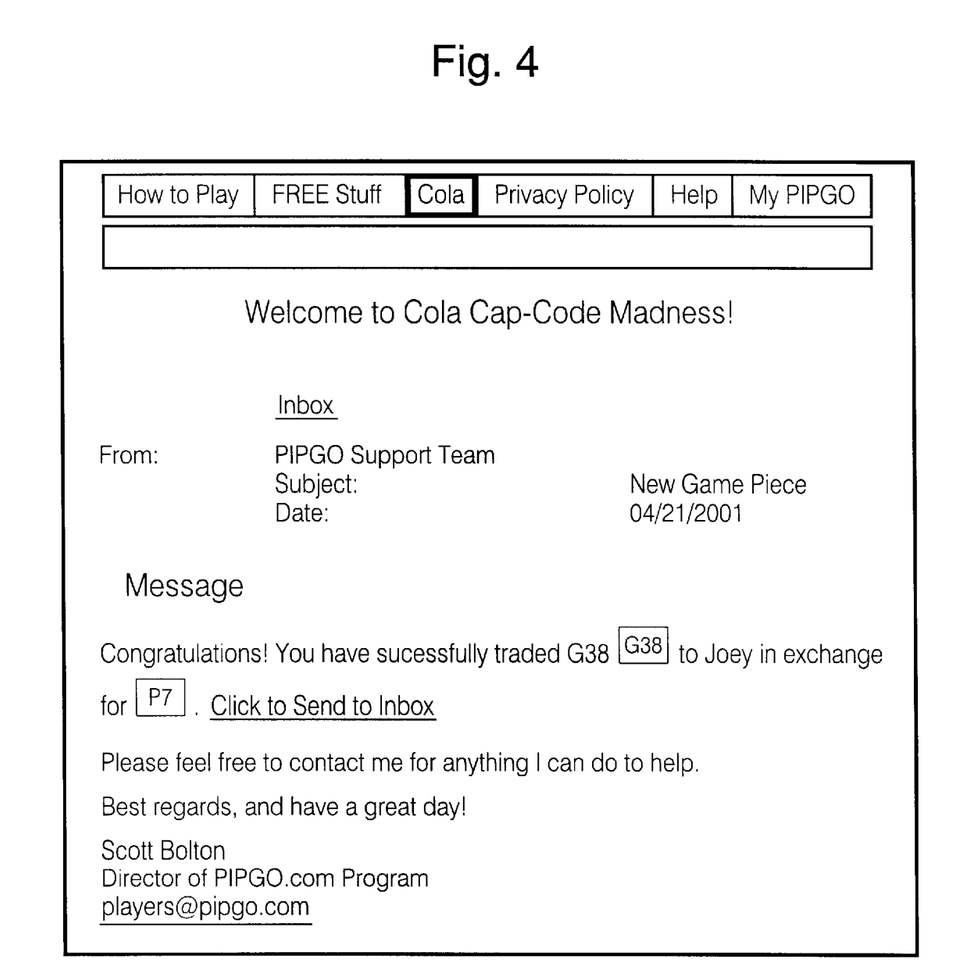
FIG. 4 is a view of a notification of a successful trade of a game piece with another player.

As noted above, players will be able to easily "share" or "trade" game pieces with other game players. A successful trade may result in a message to the user similar to FIG. 4. It is anticipated that some Sponsors will allow limited sharing or trading between less than ten players while others may allow sharing/trading between 10 or more players. The system allows for such customization and scalability as would be readily understood by those skilled in the related art. When sharing/trading game pieces, it is anticipated that once a piece is played on a specific board, it will not be able to be moved to another location on the same board or other boards, although some sponsors may wish to allow greater mobility of game pieces. The sharing and/or trading mechanisms employed by this invention and the game system in U.S. patent application Ser. No. 09/498,748 may be configured in many ways including, but not limited to, an automated matching program, a specialized "pal" or "team" sharing in-box, a "universal" sharing/trading in-box and any combination thereof. As an example, the system describe herein may, but is not limited to, make use of specific player "boxes" including an "In-Box", "I Have" box, "I Want" box and a "Share" box as described previously above with each box being enabled to allow game pieces to be moved between each. In the case of the "I Have", "I Want", and "Share" boxes, it is also anticipated that pieces from each box will be enabled to exchange game pieces contained therein with at least one other player's boxes in order to effectuate a trade or share.

Depending on the type of promotional contest, the player may have the option to "play again" or earn more chances, or try various activities to get another piece other than by means of product purchases. Such other activities include, but are not limited to answering questions, answering quizzes, solving problems, linking to other designated web sites, ordering product samples, etc. This process may be repeated as many times as the player has pieces or by predetermined sponsor rules. Please note that such a system would be impractical and place harsh burdens on the traditional or off-line collect and win or match and win games, thus the invention adds greater depth and usefulness to such games. One embodiment of the system would allow for all of a player's pieces to be played at once so as to save time before verifying steps take place. The player may further answer more questions supplied by the system or game sponsor pursuant to applicable rules. When the player clicks on "finished" (or some other ending scenario), the game web site returns the player back to the home page, where the player may then play or check out any other game as desired and proceed as above or leave the site. Alternatively, it is anticipated that a player may simply exit the site by going to another site, clicking on the X in the upper right hand corner of the game site as is commonly used, or other available means.

The system stores the time and date of entry by each player and keeps track of pieces played and any associated results. The system further utilizes appropriate software to recognize "rare" pieces or pre-selected "trigger" elements to determine the timing and re-calibration of the odds per a set of pre-determined protocols, and the Odds Accelerator is activated by such system. Upon activation of the Odds Accelerator by the system, all players may be notified by email or other means that the Odds Accelerator is now in play and various other information as determined by the sponsor or game involved, such as the new odds of winning, status of the player with the rarest piece, number of increased prizes available, etc. Therefore the system enables a sophisticated monitoring and automated solution to change a collect & win or match & win promotion's odds of winning on a real-time, variable basis while making it more likely to ensure a winner(s).

In particular, a player becomes involved with a game by obtaining a game piece element from one or more of many activities including but not limited to: purchasing a product; obtaining a receipt code; obtaining a game code from a product, TV, radio, newspaper, magazine or other promotional event or advertisement; playing a virtual game (like chess, Doom, hearts, etc) and scoring a set requisite number of points or victories; etc. The player then "plays" their game piece or element at the appropriate web site as noted above. Alternatively, and preferably, a player has become involved in a game by using his/her member card to make a transaction with a game sponsor and is subsequently automatically entered in game.

The present invention provides the unique ability to add real-time variable odds changes to any given sweepstakes or promotion type game involving elements of chance or skill based on pre-determined sponsor rules. No longer will sponsors and participants be stuck with a "one or two rare piece" promotional offering. The present invention changes the entire dynamics of the promotions industry by making promotions more user friendly and by increasing a sponsors ability to attract consumers or players.

The present invention also provides the unique ability to automatically enter participants into a game and at the same time to play their pieces for them, without the participants doing anything other than their normal behavior. Secondly, the invention herein creates a "virtual Internet" for our customers utilizing "member card" systems. A "virtual Internet" is created by our system for use by players/members that have no web access or no desire to access the web in order to play our games. For example, a poor inner city youth has purchased a bottle of Cola, among other items, at his local grocery store and "swiped" his loyalty card in order to obtain an on-line game piece(s) in the "Cola—Cola Challenge". In order to play the game piece, the youth must go to our web site, enter his member card #, select his game piece from his "in-box" and play the piece per the game's rules. This becomes a problem, however, if the youth does not have ready access to the Internet. The present invention solves this problem for the youth and the retailer by allowing game pieces to be automatically played for each member cardholder's account. Another example may be using a credit card to rent a car. The credit card transaction is downloaded to our system from the card issuer's system and our software generates the player's piece, recognizes if the player has already been set up with a game account, combines the piece with other members in a members "group" if applicable, uploads cash/other prizes to the card or other prize accounts if applicable, notifies the member by email of prizes or pieces obtained if requested, among others.

It is possible that the system can make available to the player or sponsor of a game, via the game site, all of the major languages of the world so that people may play no matter which language they speak and read. This feature may be accomplished with translation software or by other means, which may be posted on the game site, i.e. showing icons, dropdown boxes, etc. of optional languages available to play the game in.

The numerous features and functions performed and achieved by the system according to the invention are enabled by appropriate software applications, computer hardware configurations, system network and server existence and connections, web sites, internet access, etc., as will be understood by those skilled in the art.

The present invention will be further understood by way of the following exemplary games which can utilize the invention to benefit all participants, be they player, sponsor, retailers of sponsors' products, etc. These examples are in no way meant to limit the scope of the invention and are intended to be only exemplary in nature.

The first example incorporates the automated entry and the odds accelerator. The following definitions apply. Collect & Win ("C&W") is type of sweepstakes where participants must collect various game pieces over time in order to complete a game board and win prizes. A participating sponsor ("PS") is defined as a sponsor that is participating with one or more other sponsors in the sweeps, including paying to participate in the sweeps and staking part of the prize pool. Initially this will consist of consumer brands. A host sponsor ("HS") is the sponsor of the sweepstakes who is hosting the game by itself or on behalf of other participating sponsors. A point of sale system (POS) is an electronic cash registering system with multiple functionalities including inventory management, re-ordering, demographic information gathering, etc. The information will be uploaded from this system's database or on a real-time basis in order to generate virtual game pieces for specific member cardholders The loyalty program is a rewards based program offered to the consumers of a host sponsor. This takes the form of a loyalty card as a frequent shopper card. A member card ("MC") is defined as the actual card of a specific loyalty program member that is "swiped" at the checkout line. Usually this card is integrated with a HS's POS system. We will use this information to upload to our system to generate game pieces for the flagged MC. A game piece in the system will be virtual in nature and will be generated by our system through electronic date interchange between our system and a sponsor's loyalty card program based on a consumer purchase or by consumers entering a game code at our site which then uses the code to generate a game piece. A triggering purchase is a purchase of a PS's product that flags the PS's POS to print a game code on a receipt or to flag their database to upload a game piece for the member cardholder who made the required purchase.

PIPGO® (Partners in Prizes goes Online) is a C & W sweepstakes game consisting of 3 Bingo Cards and 1 Giant Bingo card where players get virtual game pieces for purchasing a PS's products. Players are allowed to share game pieces on-line with other players in order to beat the odds. Players have various ways to complete a card in order to win prizes of varying value. A PIPGO card is a bingo style card. PIP Pals are a group of players combining to overcome the odds in a particular game.

Cap or wrapper codes are game codes obtained from the underside of a product or wrapper, such as soda, candy, etc. Whereas, product codes are a PS's designated triggering code that causes game codes to be printed on a receipt or to be uploaded to our system based on a MC swipe and a receipt code is a code printed on a receipt at the POS based on specific product purchases or just the transaction code printed on all receipts. Players would enter these codes at our site to generate virtual game pieces.

The trade box are used by players on a team may offer to trade pieces with other members of the same team by placing game pieces from their in-box into a trade box. Whereas, an in-box is used to deposit game pieces once verified and generated. Players then chose where and when to play their piece or may choose to trade it.

The game used in this example proceeds as follows:

First of all, there are several ways in which consumers may obtain game codes to play PIPGO. Each will be discussed below. However, all games will be the same once a game code has been obtained. Therefore, the only difference between PS games is how the game pieces are obtained. Game pieces will be obtained from "cap codes", "wrapper codes", "printed receipt codes", and/or "product codes" associated with a member card.

The players use the game codes in the following manner. In a cap code game, players obtain game codes by purchasing specific bottles of a PS's product, such as Cola 20 oz. and Diet Cola 20 oz. bottles, removing the cap and entering the code at our site.

The sodas may be purchased at any participating retail outlet or vending machine in the geographic game area. Once a cap code is obtained, the player must go to the game site and do the following:

First, if a new user, they must sign in with a User Name and Password. This UN and PW may be stored on said computer for automatic sign on in the future.

Then, the information required to become a game player is a screen name, real or anonymous and an email address. Other info such as a mailing address or phone numbers as may be required.

Email will be used to notify players of: prizes or unused game pieces, how to obtain a prize that was won, activation of the Odds Accelerator, that a rare game piece has been obtained and other pertinent information about the current game. Email may also be used on an OPT-IN basis for PS surveys, where players can obtain email delivered game codes based on completed and returned surveys.

Once signed in, the system prompts the user to enter the applicable cap code into the "code box". Up to ten codes may be entered at a time and must be separated by a comma for database recognition purposes.

Once entered, the system asks the player to "please wait while we generate your game pieces". During this time, the system verifies the legitimacy of the game codes by cross-referencing of the eligible game code database. If the codes are deemed "valid", the system randomly generates game pieces based on a predetermined algorithm. Invalid codes cause the system to send a pop up message to the user that "the following codes are invalid—xxxxxxx. Please re-enter valid codes only." This is an added security feature that will be used to discourage "code abuse" such as 4 invalid codes results in no more entries allowed by this user for 24 hours. Likewise, if a specific computer is continually entering invalid codes under many names, then that computer Internet Protocol ("IP") address is blocked from that specific game, but not other PIPGO games unless the same scenario occurs.

Once generated, the system sends the game pieces, identified as P1, O89, to the player's In-Box based on one valid code to allow the player to receive three game pieces, thus three valid codes nets a total of nine game pieces.

The following steps used n the game play may be executed with all games for this invention.

Receipt Codes may be obtained and used to generate game pieces in two ways. The first and simplest form, basic receipt codes, regardless of specific purchases, may be used to obtain game pieces for a PS's game. Examples of this would be a grocery receipt or Credit Card receipts with a "transaction" code printed on it. The player now follows the steps outlined above in "Cap Codes".

A more complicated form is the use of receipts in conjunction with sophisticated HS POS systems. Again, these receipts would be for games involving retailers and credit card companies. However, the transaction codes are cross-referenced from the HS's database to a host database.

Receipt game codes are generated based on specific product purchases (triggering purchases) and are cross-referenced against or tied to, a transaction code and a date & time code. The transaction code serves as the main game code. A consumer selects one or more of the PS's products and then the products are scanned through the POS at checkout.

Each PS code that is scanned causes a game code to be printed in the receipt's transaction code. For example, one eligible product purchase yields a code 789ZZZ; two eligible purchases yield a code 299ZZA, etc. The code thus controls how many game pieces will be rewarded on our site. The POS is pre-programmed to complete these tasks. There are a maximum number of unique codes pre-entered on the POS for each PS product. Each code that is generated is then "removed" or "blocked" by the POS database so as not to be printed again. Once the code is generated, the player must enter the code at our site.

The following is a description of the use of loyalty cards, and automated entry and reward distribution to member cardholders.

The present invention illustrates the ability to enhance and add value to loyalty programs or reward programs. In this scenario, a consumer is assumed to be a member card holder already or is persuaded through use of incentives to become a MC holder at a website or the HS's retail outlet because of the ease of game play associated therewith. For example, a demonstration should show that a non-MC player can click on a "Sign up now for a MC and make playing easy!" link and go to the HS's site to sign up for a MC. They must then choose a designated store location to retrieve the card or wait for it to be mailed to them. This drives MC initiatives and sends traffic to the HS's site. A hyperlink back to the game should pop up after the required MC info has been entered.

MC players obtain game pieces by purchasing a PS's product and swiping their cards at the POS. The swipe tells the HS's POS to "flag" the purchase with a specified number of game piece chances or codes. For example, one eligible product purchase yields a code 789ZZZ or A27ZZZ; two eligible purchases yield a code 299ZZA or 3Z4ZA77, etc. The code thus controls how many game pieces will be rewarded on our site.

The codes are then uploaded to the game site on a delayed batch basis or in real-time depending on the HS's POS hardware and software compatibility. For the preferred embodiment, assume only real-time. The MC holder must then go to the game site, enter for example the last six digits of their MC for entry, then saved on the system and the system indicates that the game pieces are already in the in-box. The player must then play the pieces where he or she desires or can initiate various sharing strategies.

Cash or free products are then downloaded back to the MC holders card at their next swipe or the player may request prizes be sent directly to them by providing the necessary information.

Players with a member card may still obtain game plays at the POS through receipt codes as previously described here above. The demonstration should clearly demonstrate that the HS's consumers may still play the game even if they are not MC holders.

An important feature of the game system for loyalty programs is the ability to create a "virtual" C&W game. This feature is for consumers who do not have web access but are MC holders.

In this scenario, MC holders must request the HS, at the service counter, to "flag" their MC number so that the system will automatically play game pieces for them. The MC is swiped at the POS and any triggering product purchases are uploaded to the system for game piece generation. The system then opens a game account for the MC number using only the last 6 digits so that only the HS knows the identity of the player.

Once an account is opened, the system generates game pieces based on the uploaded game codes. Then the system plays the pieces on the first eligible game board in the following order: coverall Board, four corners, one row/columns, two rows/columns. If no eligible spaces, then the system keeps the unused pieces in the in-box until a space becomes eligible or the game expires.

Any prizes are automatically added to the MC account to be deducted at next checkout or we notify the HS that a particular prize needs to be mailed to MC number xxxxxx, only the host sponsor knows who the MC holder is. Alternatively, HS may give the information to an outside entity tasked with implementing this invention.

Unlike all other players, automated players are not allowed to trade or play on a team board and must notify the HS if they wish to deactivate automated play so as to control their own destiny.

Game play is facilitated in the following manner. Each player has three small game boards and one larger game board in a bingo format that is a grid pattern with a specific number of rows and columns.

Small Game Boards consist of three standard, twenty-five square bingo cards each having five rows across and five columns. However, the three small game boards will each have three unique patterns, with only one of these patterns available at a time. The player must complete the small board in order to win the prize associated therewith. Prize levels differ based upon the pattern used by the player. Therefore, all players will be playing different game boards at any given time.

For example, the first small game board has a "free product" prize associated with completion. Its patterns consist of "4 Corners". A second small game board has a "$5 cash" or a "$5 grocery money" prize associated with completion. Its patterns consist of "1 row or 1 column". A third small game board has a "$25 cash" or a "$25 grocery money" prize associated with completion. Its patterns consist of "1 row and 1 intersecting column".

Each small game board will have an empty "space" where non-used squares would have been. This space will contain a PS's or HS's logo or banner add and associated link to their website. Players may link to the sponsor's web site and link back to the game. The space will be filled on a rotating basis based on a given PS's contribution to the prize pool. For example, if Cola purchases 20% of the game costs, then every fifth card would generate a Cola logo.

There will be one each of the three game designs for the consumer to play at any given time. One four corner, one single Row/column, and one double rows/columns.

Players must complete the design with their own game pieces or game pieces traded with other players. Only the player who "owns" a small game board is allowed to claim a prize associated therewith. Once a small game board has been completed, it is replaced with a new small game board of the same prize level and the design pattern will change to one of the other two choices.

Large Game boards consist of a "Coverall" game board with 5 columns intersected by 12 rows resulting in sixty total squares. All of the players' coverall boards are identical to one another, unlike the smaller boards. Examples of a prize level for this particular board include larger scale prizes such as $1 million or four $250K prizes for the first four boards completed. For preferred embodiment uses a prize commonly given away such as $1 million prize. The first team to complete the team coverall or the first player to complete their own coverall board wins.

The two center squares are "free spaces" and have the HS's logo inserted into each. For example, "Free space sponsored by SuperMart". Therefore, there will be no P30 or P31 for use on the coverall board although these pieces will still be used for the small boards.

Players may share or trade game pieces between a designated group of players in order to beat the odds. This is accomplished by moving pieces from your in-box into the trade box or by playing, also referred to as sharing, a game piece on the Team coverall board. This may be accomplished by methods known to those skilled in the art such as clicking on a game piece in the in-box and then clicking on the appropriate shared card spot or trade box icon. Clicking on the trade box moves the piece into the trade box, but the player may still "play" this piece anywhere, until it has been traded away.

Players will initially be allowed to share and trade only with a maximum of 9 other members of a group. Therefore, players may form teams of ten or less. Alternatively, a player may choose to go solo by not joining or forming a team. There will be an icon on the "home page" of the game being played where players can form groups. There are several ways to form a group.

When playing a cap code or receipt code game, players must fill in the screen names of other players who they wish to link or combine forces with and name the team. At their next log in and via response requested email, all named players will see a pop up window asking: "Username has formed a team called "group name". If you agree to be part of this group click OK. If you do not wish to be part of this team click NO."

If playing a combo receipt/Loyalty Card game, then players follow the steps as illustrated above, except that, instead of entering only screen names, you may enter the last 5 digits of the MCs of the players you wish to form a group with.

Finally, you may request via an icon, or other commonly known method, to have the system create a team of ten players for you. This automated team entry is based on sequential clicks of this icon by all players. In other words, the first ten players to click on "Form an automated team" are assigned to each other. The next ten are then assigned to each other and so on. Again, at the next log in, each assigned player will be asked to agree to his or her team assignment as automated by the system. The name of the team will be a random PS theme such as "Cola Team #1".

Once a player has agreed to form a team, they are bound to this team for the duration of the game. However, they may choose NOT to be an active participant by simply NOT moving their game pieces from their in-box into the trade box and by not playing their game pieces on the team coverall board or shared board.

Team Play has the following features and benefits. Each team member gets their own coverall game card where they can play pieces first if they so choose. Each team gets a coverall game card. All team members can access this card at anytime. This team coverall card is "highlighted" on each of the team members' personal game page and resides next to their private coverall card.

Each time that a member of a team places a game piece on the team share card, this piece shows up on all team member share boards. Likewise, the piece played on the team coverall changes from a number, such as G37, into the name of the team member, such as John Doe. Thus each team member can see how many pieces they have on the team coverall board. A team member may determine his ownership percentage by clicking an icon to inform the player how much of the total board, and thus the prize, they currently own.

Each team member may request a trade from other team members only. To accomplish this, a team member clicks on a game piece in their in box and then clicks on the "trade box". The original owner may still play this piece until it is traded away. At this point, the player must enter pieces he wants in exchange. Preferably this will be automated by the system by means of the system entering ALL open squares into the trade box. If another team member enters corresponding wants/needs in their trade box then the system swaps the pieces automatically on a first come, first served basis. Any matches are then sent to the appropriate team member's in-box and then the player can play it on any of their personal boards or the share board. Likewise, a player will have the option to specify which piece they want in exchange for the piece they are offering the trade. For example, an individual has O38 but will only exchange for G29, the following is entered "PIECE TO TRADE: O38 and PIECE TO RECEIVE: G29". If a specific piece is not specified to receive, then the system will automate the first available trade from the other players. Players continue to obtain game codes and game pieces, playing those pieces until there is a winner.

Prizes are added back to loyalty card members for deduction from their next grocery bill at the time of checkout. For example, if someone wins a "free Cola" then, they pick up the cola along with their other items and go to the checkout line. The Coke will be scanned for billing purposes but once the MC holder swipes his MC, the system recognizes that the loyalty number has been flagged for a free cola and thus subtracts the price from the receipt.

Alternatively, and for non-free products or cash back prizes, any specific prize may be mailed to the consumer at their request or prize "award receipts" will be emailed to the player for redemption mail-ins or hand-ins at the Customer Service desk of the HS or PS.

The following is an example of a Collect & Win enrollment at a Sponsor's site such as Dunkin Bagel.

The facts for the first variation are as follows. It is 7 AM and George has just walked into his local Dunkin Bagel for a coffee, donut, and orange juice. George could've obtained 3 similar items at the nearby McBurger, Burger Queen, or Bagel shop, but he stopped at Dunkin Bagel. The reason is because he saw their add for a collect & win game whereby he could win $1,000,000 plus other prizes.

As he waits in line, George reads over a glossy, one page description of the "Dunkin' For Dollar$" $1 million contest. Being skeptical, George scans the rules and odds of winning: 1 in 100,000,000! So he figures there is no chance to win the big money.

Upon ordering and paying for his donut, coffee, and juice, George receives two collect & win playing pieces. The first is peeled off from his coffee cup and the other is a code number given out on his receipt (or another game piece with a code only etc). As he walks out, George notices that several children are swapping pieces with their friends at the next table. Billy, one of the kids, tells another child, "I don't need that piece, I got it yesterday at the web site." George makes a mental note to check out the web site to see if he can win a free coffee or donut or the million, but thinks yeah right.

Like most workplaces today, George's cubicle is equipped with his own terminal that is connected to the Internet. As he sips his coffee, the donut being devoured in 4 ½ bites in the car, George boots up his terminal and goes to www.dunkin-bagels.com. He has three pieces to play—1 for the coffee, 1 from the coded receipt, and 1 that was left on a cup of coffee in the cubicle next to him. At the site he is required to sign in with a username and password—"Not again". George, like most people, uses the same ones for 90% of his surfing sites. Upon registering fake information, but his real email in case he does win something, George sees a message: "Thank you for registering for the Dunkin' for Dollar$ sweepstakes. (click here to remember pw and un). You are now registered to play other BBG Ventures' games as well.

George is now half way through his coffee and has read the rules: Click to play your pieces. Click on the piece you are playing. Enter your code off the piece you played so that the computer verifies the piece, your ownership, and so that you do not have to keep it. Click to play another piece or a piece code obtained from your local Dunkin Donut receipt. Click for a "free" piece and an extra chance at winning $1,000,000.

George enters his pieces and, since he does not feel like working right at this second, he decides to click on a free piece chance. The screen brings up a roulette wheel and George is instructed to click on and drag the red ball over to the spinning wheel, and then release the mouse button. The ball drops into the spinning wheel and bounces around. George has been able to quickly visualize the prizes offered on the wheel: free coffee, play again (a lot of those), free orange juice, free donut, free DB hat, free DB t-shirt, letter D, letter N etc., $50, $5.

So, he decides to click and drop the red ball. Whilst sipping his coffee the ball stops on "play again"—of course. So he drops the ball again and this time it stops on the letter D. George drags and drops again and hits another play again. Drag drop and "Free coffee". George smiles.

A window pops up and George is told that a coupon for a free coffee will be sent to his email account and is asked: "Do you prefer DB coffee to McBurger's coffee?" Please click on Yes or No. George clicks on yes because any fool knows that DB coffee is better than McBurger's coffee.

About 2 hours later, George goes to the office break room and retrieves his OJ that he purchased earlier at DB. Luckily no one has stolen it. As he pulls off the tinfoil cover, he notices a code # on the underside. Oh, another piece. George clicks on his bookmarks, goes to DD, and is greeted "Welcome back George." He enters his code number, is told what piece he has obtained and decides to play roulette a couple of more times. He drops the ball and gets another letter D, 3 play again, a letter U and 5 play again. A window pops up and asks, "Have you ever tried a DB bagel? Click yes or no." George clicks on no.

While playing again and again George notices that he can "Check Your Stats" and clicks on it. Listed are all of George's pieces, along with the time and date played. He then clicks on "View Your Board" and up pops the game board showing each piece played and what is missing. George, mildly interested, clicks on "View Your Odds-Breaker Board". Now, all of a sudden, George sees that his pieces, highlighted as blue pieces, are being combined with some yellow, red, orange, and green pieces. George perks up a little and takes notice. He decides to read the rules a little more closely.

Upon further research, George has discovered the following: a) He can play his pieces on his own board; b) His pieces are also automatically "shared" with other players' pieces based on time and date. He discovers he is entered on 3 separate boards, each board being at various stages of completion. A few paragraphs into the rules, George reads that his piece is first entered on his board and then entered on any other "open board" where the piece he is playing has not yet been played. His piece is shared first with any other board he is associated with (so as to maximize the number of his pieces on that board) and then with the next available open space. It is explained that even though you may have obtained 100 letter Ds, they are ALL USEFUL in that they will be played on every board that needs a letter D.

The rules also state that the physical game, whereby pieces are obtained off from coffee cups, OJ caps and donut boxes will end after 60 days from start of contest. However, if there is no winner by that time, the game will continue at the web site's roulette wheel for 6 months or until there is a winner of the Grand Prize. Pieces may still be obtained by way of coded receipts, where the code is entered at the web site and a virtual piece is awarded. As always, the virtual piece may be a letter, coupon, or instant win prize.

George thinks to himself: "Someone is definitely going to win the $1 million or at least share in part of that. Let's see, there are 15 letters in the game. If I get only 1 letter in a completed board that's $66,666." George plays the roulette wheel a few more times.

An interesting side rule of the game encourages sharing of pieces. Should an individual enter or obtain the rarest winning piece, an accelerator is triggered. This may happen at any time during the game. In this case the rarest piece is the "$". Upon entering a physical piece she obtained at a DB in Backwoods, Ark., Shirly gets a pop up message saying "Congratulations Shirly. YOU have just obtained the rarest physical piece in our sweepstakes." It just so happens that this is only the second time Shirly has played a piece. And she is playing it for her son Bo. This event triggers a chain reaction.

The rules state that there can be only one winning board. That once the rarest piece has been entered, the "Odds Accelerator" increases the coded odds, i.e., pieces that are obtained by receipt or cap code, or by roulette, every four hours until either Shirly obtains all of the other pieces for her board solely, or until Shirly shares the piece with a "Buddy Board to complete the game, or until Shirly lets the Odds-Breaker Board put together all played pieces coupled with hers to end the game (on a first played first matched basis). Should Shirly elect to play by herself, she now risks another "$" being generated and another board being completed first. Shirly would then lose out if she was not part of the new "$" Buddy Board or OB board. Upon the second "$" being generated, the VPG increases the odds even further every 2 hours and so on until a winning board has been determined. Therefore, Shirly can risk it all or share to win (many small changes to this concept can be made depending on the sponsor and the rules—for example, the bargaining for the largest cut of the pie based on the rarest piece getting the most he/she can from other players but knowing that another piece may come out at any time).

At the time of Shirly being congratulated on obtaining the $, the system has emailed all members with notification that the rarest piece has been obtained and that the odds will be increasing for another piece by the hour. They also get a code to enter at the web site for a virtual piece in their email.

Likewise, this game could have been automated by means of "member cards". Such a game may involve a grocery chain instead of Dunkin Bagels and the purchase of soda Z and cereal X. If George used his member card (check cashing card, credit card etc.) to make the purchase then the system would automatically enter him in the contest and automatically generate a piece. This of course is based on the game's rules and set protocols such as what products need to be purchased, how many, and/or the overall size of the grocery bill. Alternatively, he may still obtain the piece as described above by means of a receipt or some such code.

The second variation is as follows. Upon further research, George has discovered the following: a) He can opt to play pieces on his board only; b) He can opt to share his pieces with others based on time and date of entry; c) He can opt to share his pieces on a special board of friends, family and co-workers; or d) He can elect to play his pieces on all fronts with a catch. The catch is that the physical part of the game ends in 60 days from start, but will continue in a virtual manner for another year or until there is a winner. At the end of the physical date, each player will have to choose which board they want to play on: either your own, friends & family, or by date and time only. At this time, a piece laid is a piece played.

George decides that for now he will play his own board in hopes of winning the $1 million by himself. Over lunch however, George talks about the DD game with his co-workers and they decide to "Name a Board" and share pieces there with friends from around the country whom they all keep in touch with by email. They have essentially figured out that they can beat the odds more easily by obtaining pieces everywhere the game is played and then sharing them. George takes a leadership role in his group and names the board "Doughboys" and signs up for an "Odds-Breaker Board" at the DB website. Email instructions with the board name are sent to all of their "partners".

The game allows for each player to sign onto a board to share pieces. Therefore, when George and his "Partners" sign on to play a piece they get a message that says: "You have elected to play your pieces on the Doughboys board. Should the piece you are about to play be already located on the Doughboys board, you may elect to play the piece on your own board or a General OddsBreaker board. From here on out the rules and play are similar to that noted above (Obviously there are an unlimited number of ways to structure such games).

The third model is a Mountain Rain Collect & Win solution at our site.

Again the first variation is as follows. It is a hot, steamy afternoon in Boston. Bret, also known as "Scratch" has been skate boarding since noon. He's hot, thirsty, and about to pick a cold soda from the local 7-11. What is he going to choose? Milk? Juice? Or Mt. Rain? Since he remembers a recent add about a Mt. Rain Sweepstakes contest, where he can win an all expenses paid trip for two to an upcoming band concert in London, plus star in a new skateboarding advertisement, he goes for the Rain.

After the first chug, he looks at the cap in his hand. "Seat 25, Row A". Scratch takes another gulp and quickly reads the rules. "Match any two consecutive seats and you win." Pretty simple he thinks, but I only have 60 days to get a matching seat. What are the odds? "Not good."

He keeps the cap anyway because some of his skate buddies drink Mt. Rain and maybe they have a matching seat. They don't, but one of Scratch's friends, Bilbo, knows of an awesome web site. "Check it out. You can share your cap (type B allows you to get extra pieces because Mt. Rain has signed on with us) with other people around the world to try and match seats."

So the skate circle starts drinking only Mt. Rain, each hoping to match their pieces amongst themselves or with others from around the globe. Each day they sign onto our site, enter their seat number and wait for email notification of a match. They tell their friends, family, girlfriends, and others they meet. "Dude, are you going to use that cap? Cause I need it to win a trip if you don't . . . " Bilbo notices that he can get a special 7-11 card that automates entry into the game for him every time he buys a Mt. Rain or more than $15 worth of any products in the store. The next time he goes to a 7-11, he signs up for a member card.

Scratch checks the web site everyday to see if there have been any winners. In week five of the contest, he gets an email letting him know how many people have played pieces, how many pieces have been played, and that two people have matched a winning set of seats. They are going to London. According to the official rules, there are ten more sets of potential winners and three weeks to go.

"Someone in Mississippi and Iowa just won 2 of the Rain tickets. We need to drink an extra Rain a day from now on . . . " Bilbo is amazed that there are any winners, and verifies it by checking his email later that day. "Excellent," he thinks.

While at our site, they also notice there is a similar game going on for Snackers chocolate bars and 7-11. Since they often have the munchies, they start eating Snackers instead of Milkiways.

Following is an example of the odds accelerator for a Scratch and Win Sweepstakes. For every player that scratches an element on-line, the system keeps track. When x number of scratched pieces have been played, the Odds Accelerator will increase the odds of future plays. Therefore, it now "pays" to play more often because the more people play the more chances to win are thrown into the mix.

Alternatively, say that an instant win game contains "play again", "win $5", "win $10", etc up to "win $10,000". The system tracks how many people have won $5. Once 1000 people have won $5, then an extra 100 $10 winners will be allocated. Likewise, once 1000 people have won $100, then an extra $10,000 will be allocated to the mix. And so on . . . pursuant to a sponsor's rules. Players may have been entered in the contest automatically at time of purchase of say a box of cereal or may have obtained a "play" from use of a receipt code or other code. Any prizes are then credited to their member account, the web account, or are mailed to them in the form of a check, etc.

What is claimed:

1. A method for increasing a player's chances of winning a game wherein the game requires multiple game pieces to be matched in a specific winning combination, said method comprising the steps of:
    receiving and inputting data for at least one game player, said data including identification of said player and at least one of collected game pieces and needed game pieces;
    facilitating acquisition of at least one of said needed game pieces by said player in order to achieve said specific winning combination;
    receiving a predetermined prize when said player acquires said winning combination, wherein said predetermined prize is automatically delivered to said player.

2. The method according to claim 1, wherein a computer based system is used to implement said method.

3. The method according to claim 1, further comprising the step of manipulating said data for each of said at least one game having unique information stored on a computer based system.

4. The method according to claim 1, further comprising the step of identifying said game piece by a bar code associated with a product purchased by said at least one game player.

5. The method according to claim 1, further comprising the step of issuing a member card; said member card automatically enrolling said at least one game player into said game upon use of said member card.

6. The method according to claim 1, further comprising the steps of implementing an odds accelerator, wherein said odds accelerator comprises the steps of:
    creating a virtual game piece, wherein said virtual game piece is prearranged by a sponsor; and
    making said virtual game piece available to said at least one game player at a time to be determined by said sponsor.

7. The method according to claim 1, further comprising the steps of:
    receiving said data via telephone communication between said player and a central information processing location.

8. The method according to claim 1, further comprising the step of identifying said game piece by a receipt code associated with a purchase of a product by said at least one game player.

9. The method according to claim 1, wherein said predetermined prize is distributed to said player when said player next uses a facility participating in said game.

10. The method according to claim 1, further comprising the step of facilitating use of said method by multiple players.

11. The method according to claim 10, further comprising the step of matching said data from selected members of said multiple players to match said multiple game pieces into said winning combination so as to allow said multiple players to collectively win said game.

12. The method according to claim 10, further comprising the steps of:
    storing said data on a computer;
    establishing a website accessible by said multiple players of said game; and
    permitting selective access to said web site by said multiple players through use of a username and a password.

13. The method according to claim 12, wherein said website stores data in a location associated with said collected game pieces and said needed game pieces.

14. A method enabling at least one player to increase a likelihood of winning at least one of a collect-and-win game and a match-and-win game promotion while simultaneously increasing an appeal of said game to the player and thus making a substantially more valuable system for a promoter, comprising the steps of:
  providing at least one game piece to at least one player;
  applying said game piece to an appropriate game board at a game site;
  making game piece information available to said player, said game piece information indicative of needed game pieces needed to complete a winning combination of game pieces to thereby win said game, whereby the player may share or trade game pieces with at least one other player,
  enabling said player and said other player to easily and securely store said game pieces for future use.

15. The method of claim 14, wherein said step of enabling further comprises the step of enabling said player and said other player to discard unwanted pieces and to obtain desired pieces.

16. The method of claim 14, wherein said game site is an Internet website.

17. The method of claim 14, wherein said game site is a host site.

18. The method of claim 14, wherein said game piece is a physical object.

19. The method of claim 14, wherein said game piece is a virtual object.

20. The method of claim 14, further comprising the step of making available on said game site to said player at least one of an In-Box representing possession of said game piece by said player a Share/Trade Box permitting trading of said game piece wherein said game piece may be traded for a different game piece.

21. The method of claim 14, further comprising the steps of:
  making available a computer based apparatus having limited access;
  generating at least one game board; and
  associating said game piece with said at least one game board.

22. The method of claim 14 said method comprising the following steps:
  issuing said player a member card, wherein said member card is associated with an account number specific to said player
  facilitating an automated game play for said player, wherein said automated game play is executed without access to said game site by said player; and
  crediting said player with a prize associated said winning combination.

23. The method of claim 14, wherein said game continues until said winning combination yields a prize to at least one of a group of players.

24. The method of claim 14, further comprising the step of making available to said player a predetermined set of rules, wherein an odds accelerator varies said likelihood of winning, said odds accelerator comprising the step of obtaining a rare game piece by said player or a group of players based on a triggering event.

25. The method of claim 24, wherein said triggering event is activated by said promoter.

26. The method of claim 24, wherein said triggering event is activated by said player.

* * * * *